United States Patent [19]

Miller

[11] Patent Number: 4,788,794
[45] Date of Patent: Dec. 6, 1988

[54] FOUR SIDED FLUSH GLASS

[75] Inventor: Larry D. Miller, Rochester, Mich.

[73] Assignee: General Motors Corporation, Detroit, Mich.

[21] Appl. No.: 107,009

[22] Filed: Oct. 13, 1987

[51] Int. Cl.$^4$ ............................................. E05D 15/10
[52] U.S. Cl. ........................................ 49/214; 49/211; 49/375
[58] Field of Search ................. 49/211, 215, 216, 221, 49/225, 227, 260, 374, 375, 376, 377, 348, 349, 350, 351, 352

[56] References Cited

U.S. PATENT DOCUMENTS

| 2,979,327 | 4/1961 | Swanson | 49/211 |
| 3,062,528 | 11/1962 | Martens | 49/227 |
| 3,453,778 | 7/1969 | Daugirdas | 49/215 |

FOREIGN PATENT DOCUMENTS 1210691 2/1966 Fed. Rep. of Germany ........ 49/227

Primary Examiner—Kenneth J. Dorner
Assistant Examiner—Gerald A. Anderson
Attorney, Agent, or Firm—William A. Schuetz

[57] ABSTRACT

A window guide arrangement for a door assembly of an automotive vehicle has a pair of one piece guide tracks and a pair of guides having spaced guide pins secured to a movable window and cooperatively received on the tracks and in which the guide tracks and guides are constructed and arranged such that they guide the window so that its inner side engages a seal and so that its top and lower ends are moved inwardly against the seal and outwardly of the door, respectively, when the window approaches its closed position so that its exterior is substantially flush at all sides with the adjacent exterior surfaces of the vehicle and door assembly.

6 Claims, 3 Drawing Sheets

FOUR SIDED FLUSH GLASS

The present invention relates to a door assembly for an automotive vehicle and more particularly to a door assembly having a novel window guide arrangement which is operable to guide the window through its movement and to position the same so that it is substantially flush at all sides with the adjacent exterior surfaces of the vehicle while engaging a seal means located along its side edges interiorly of the window when in its closed position.

Heretofore, window guide arrangements for door assemblies of automotive vehicles have been provided which guide the movement of a window through a path such that its outer side is moved outwardly to engage a seal carried by the door assembly and which is substantially flush with the exterior of the door assembly or vehicle body when in its closed position. Examples of such door assemblies are shown in U.S. Pat. No. 4,575,967 and German Pat. No. 24 35 766. The disadvantages of these arrangements are that they require fairly complicated guide track and guides or rollers and that the use of an outer seal reduces the degree of flushness that can be achieved along its sides and top. It is also known to move a window away from an inwardly disposed seal during its opening and closing movements to effect a tight seal when the window is closed and to achieve a degree of flushness with the exterior door assembly. Examples of such arrangements are shown in U.S. Pat. No. 4,483,100 and German Pat. No. 32 10 468. These arrangements also require fairly complicated guide tracks and guides and do not lend themselves to achieving flushness at the belt line of the door assembly.

Accordingly, it is a broad object of the present invention to provide a new and improved window guide arrangement for a door assembly of an automotive vehicle which is of a simple and economical construction and which is so constructed and arranged that it guides and positions the movable window so that its inner side engages a seal and its outer sides are substantially flush with the exterior body structure of the vehicle and such that it is substantially flush with the outer door panel at the belt line thereof.

Another object of the present invention is to provide a new and improved window guide arrangement, as defined in the preceding object, and which includes a pair of spaced one-piece guide tracks carried by the door assembly and each including a lower channel shaped guide track portion disposed within the door and terminating in a skewed section extending toward the belt line of the door assembly and a flange portion extending along the side of the door assembly along its upper frame and into the door, and which further includes a pair of guide means secured to the window at its inner side and adjacent its side edges and with each of the guides having a lower guide pin adjacent the lower end of the window which is slidably received within the adjacently located channel shaped lower track portion and an upper slotted guide pin slidably received on the adjacent upper flange portion, and wherein guide pins located in the lower guide tracks cause the lower end of the window to be moved outwardly toward the outer door panel while the upper slotted guide pins allow the window to pivot thereabouts so that the upper end of the window is caused to move inwardly into sealing engagement with the seal means as the window approaches its fully raised position whereby the window will be substantially flush with the adjacent vehicle body structure and belt line of the vehicle.

Yet another object of the present invention is to provide a new and improved window guide arrangement for a door assembly, as defined in the next preceding object, and in which the guide means comprises a base portion which is secured to the window via flush rivets and wherein the guide pins extend inwardly from the inner side of the window and are operable to guide the movement of the window when it is being lowered and raised and with the skewed sections of the lower guide track portions causing the lower guide pins and the lower end of the window to be moved outwardly toward the outer door panel while the upper slotted guide pins allow the window to pivot thereabout so that the upper end of the window is caused to move inwardly into sealing engagement with the seal means as the window approaches its fully raised position whereby the window will be substantially flush with the adjacent vehicle body structure and belt line of the vehicle.

Yet another object of the present invention is to provide a new and improved window guide arrangement for a door assembly, as defined in the next preceding object, and in which distance between the upper guide pins and the top of the window is substantially twice the distance between the upper and lower guide pins whereby good window stability is achieved by the guide means and tight sealing engagement between the upper end of the window and the seal means is achieved when the window is moved to its closed position.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
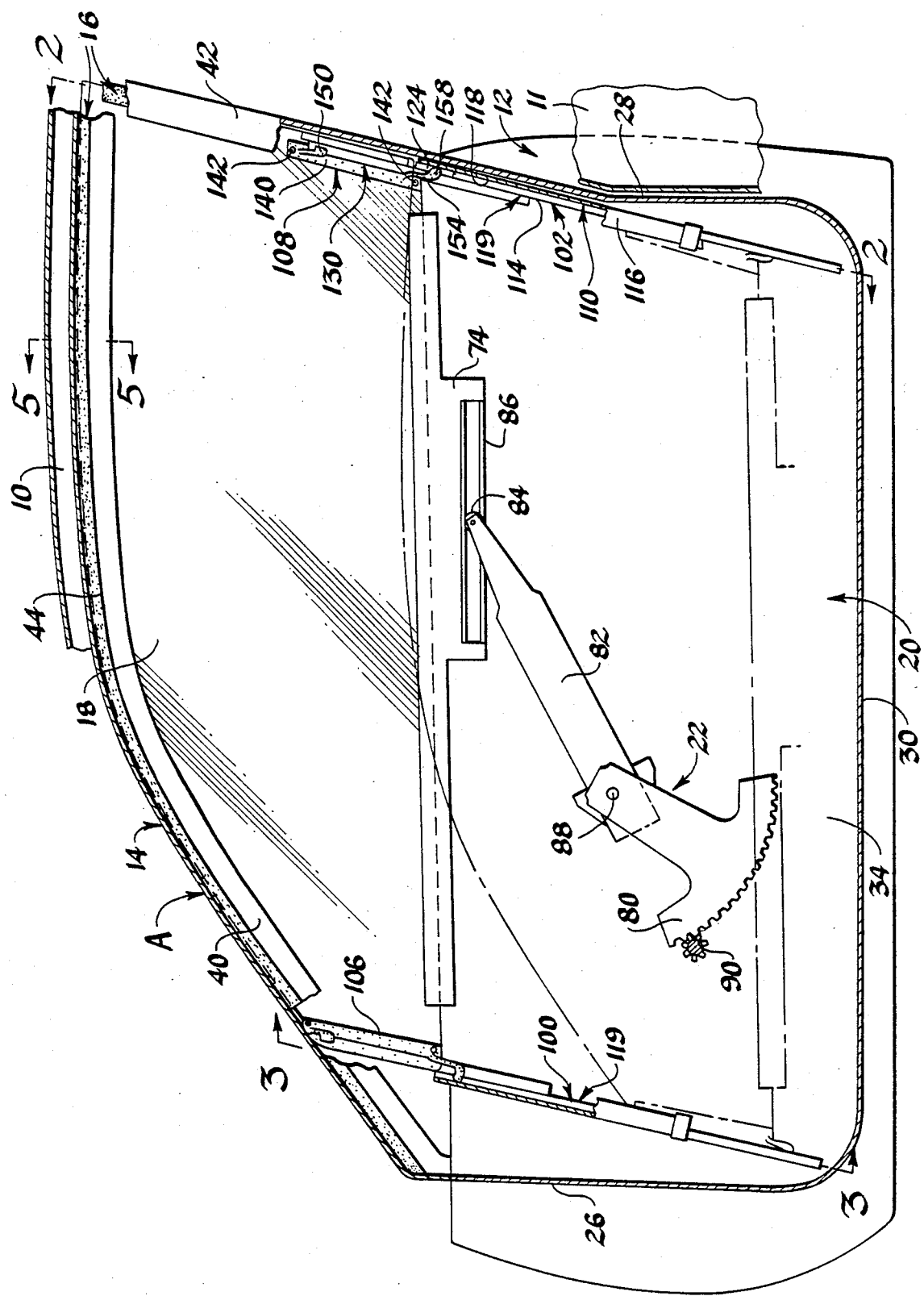
FIG. 1 is a side elevational view, with portions shown in section, of the novel door assembly of the present invention.

Referring to FIG. 1 of the drawings, a vehicle door assembly A is there shown. The vehicle door assembly A is adapted to be used in an automotive vehicle (not shown) having body structure (not shown except for body structure 10 and 11 defining part of the roof and sides of the vehicle) which defines a door opening. The door assembly A is adapted to be suitably hinged adjacent its left end, as shown in FIG. 1, to the side vehicle body structure for movement between open and closed positions and in a manner which is conventional.

The door assembly A comprises, in general, a lower door body 12, an upper inverted U-shaped frame 14, a stationary seal means 16 carried by the U-shaped frame 14, a window 18 which is supported for movement between open and closed positions, a window guide arrangement 20 for guiding the movement of the window 18 between its open and closed positions and a window regulator mechanism 22 operatively connected with the window 18 for raising and lowering the window 18 between its open and closed positions.

The lower door body 12 comprises a suitable door means having spaced outer and inner panels 22 and 24 and spaced fore and aft ends or panels 26 and 28 and a bottom wall 30 which may be integral with the inner panel 24. The inner and outer panels 22 and 24, ends 26 and 28 and the bottom 30 are suitably secured or welded together and together define a well 34 having an elongated slot or opening 36 at its upper end, which end also defines a belt line for the door assembly A.

Figure 5:
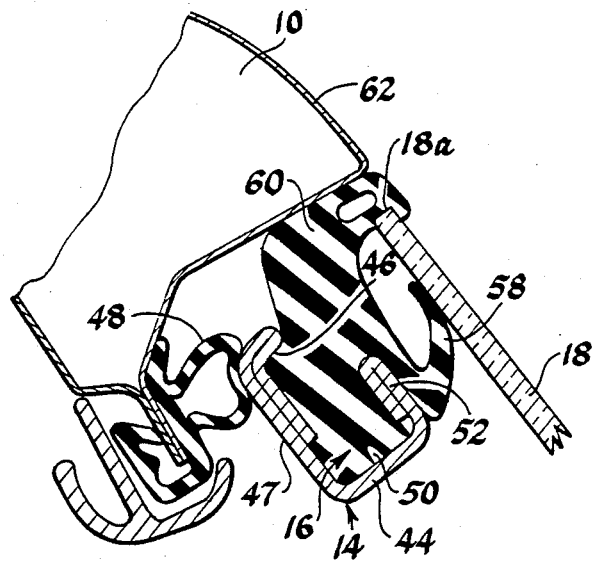
FIG. 5 is an enlarged cross-sectional view taken approximately the lines 5—5 of FIG. 1.

The upper frame 14 is generally U-shaped as viewed in side elevation in FIG. 1 and can be of any suitable or conventional construction. The frame 14 can be integral with the inner panel 24 or suitably welded or secured to the fore and aft ends 26 and 28 of the lower door body 12. The frame 14 comprises a pair of sides 40 and 42 and a top 44. The sides 40 and 42 are U-shaped in cross-section and have their open ends or sides 45 facing each other and the top portion 44 has its open side or end 46 facing toward the roof 10 of the vehicle, as best shown in FIG. 5. The U-shaped frame 14 carries the seal means 16. In addition the U-shaped frame 14 has an inner wall or flange 47 which engages a seal 48 carried by the vehicle roof and body side structure 10 and 11 to provide a seal between the door assembly A and the vehicle interior when the door assembly A is closed.

The seal means 16 along the sides 40 and 42 of the frame means 14 comprises a main body portion 50 which is press fitted over a flange 52 at the outer most side of the frame 14 and a deflectable finger like shaped portion 54 located between the flange 52 and the window 18 and which can be readily deflected and engaged against the window 18 on its inner side and adjacent to its side edges. The deflectable portion 54 is coextensive with the extent of the sides 40 and 42 and top 44 of the frame 14. The seal means 16 adjacent the top edge 18a of the window 18 has a thicker body portion 50 which is press fitted over the outermost flange 52 of the frame means 14 and also includes a deflectable finger portion 58 which engages the window 18 when the latter is in its closed position adjacent its top edge 18a along its inner side. In addition, the seal means at the top portion 44 of the frame 14 fills the recess between the flanges 47 and 52 and extends through the open side 46 to define a vehicle body engaging portion 60 which is hollow so as to be readily deflectable and which is adapted to engage the vehicle body structure 10 adjacent its roof line 62, as best shown in FIG. 5. Thus the seal means 16 along the top portion of the frame 44 also serves as a seal means between the roof 62 of the vehicle and the upper door frame 14. As best shown in FIG. 5, the window 18 when in its uppermost closed position, engages the uppermost portion 60 of the seal means 16 at a location such that the exterior side of the window 18 is substantially flush with the exterior side of the roof 10 of the vehicle.

Figure 2:
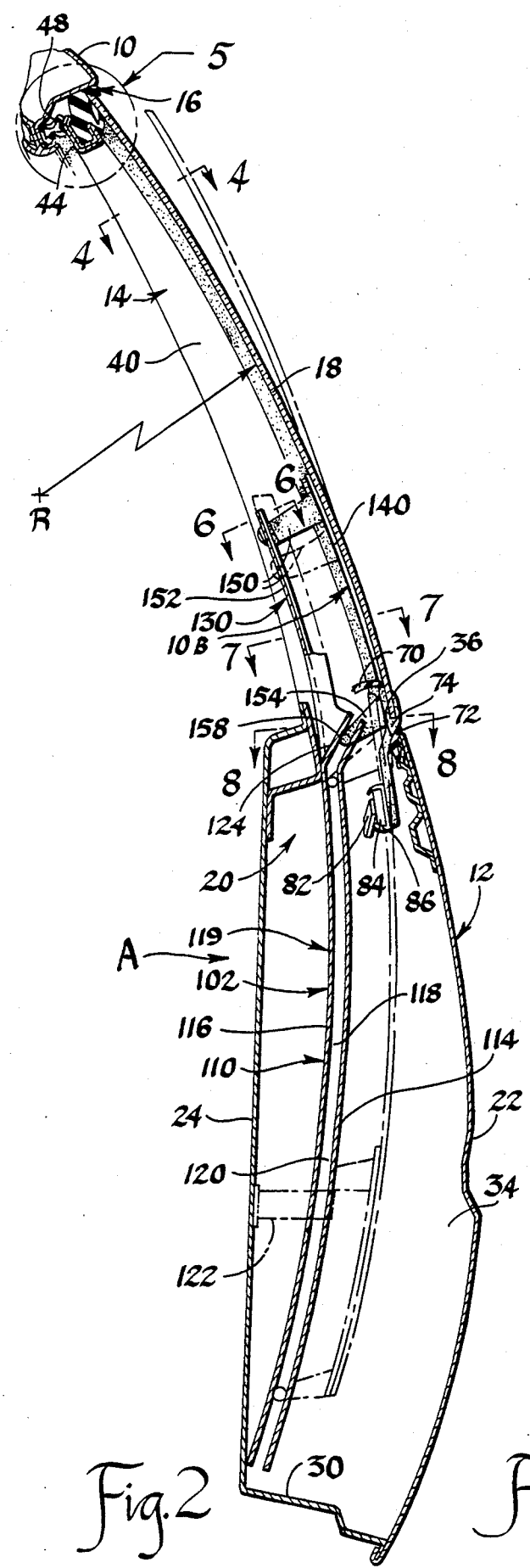
FIG. 2 is an enlarged sectional view taken approximately along lines 2—2 of FIG. 1.
Figure 3:
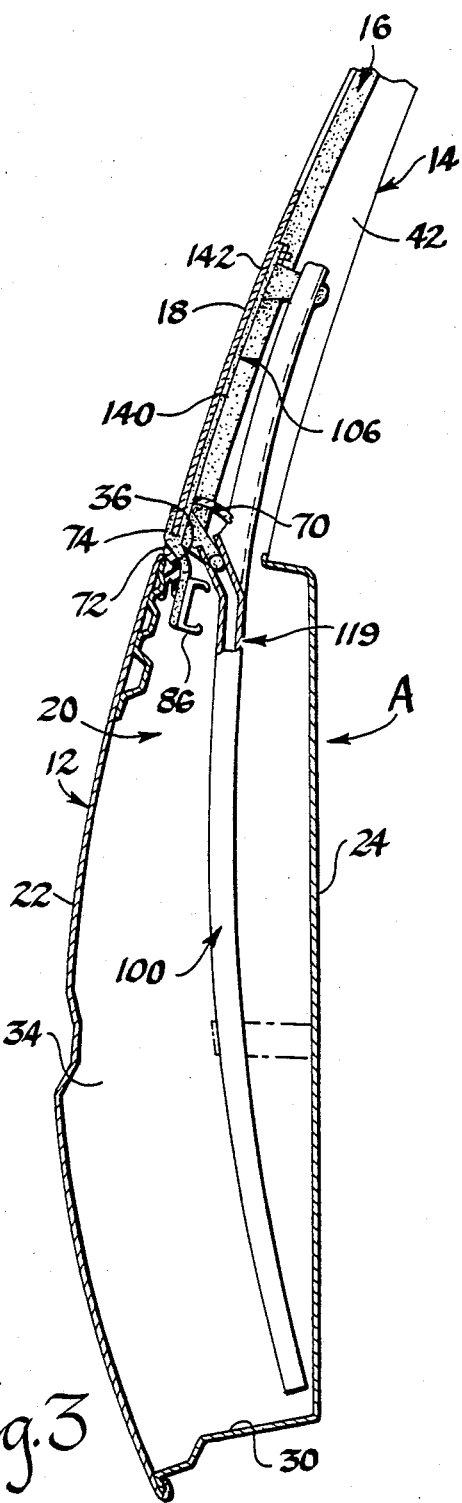
FIG. 3 is an enlarged fragmentary cross-sectional view taken approximately along the lines 3—3 of FIG. 1.
Figure 4:
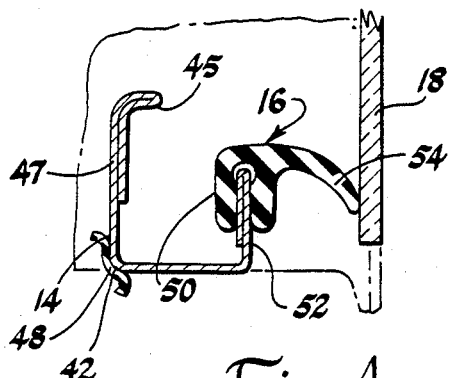
FIG. 4 is an enlarged fragmentary sectional view taken approximately, along the lines 4—4 of FIG. 2.

The window 18 can be made of any suitable or conventional material, such as glass, and is shown as a curved window having a radius of curvature R, as best shown in FIG. 2. The window 18 as it moves between its upper and lower positions, engages the portions 54 of the seal 16 along the sides of the window, and when in its upper closed position, as shown by the solid lines in FIG. 2 or as in FIG. 5, engages the portions 58 and 60 of the seal means 16 adjacent the upper side 44 of the frame 14. The seal means 16, in conjunction with the window guide arrangement 20 functions to position the window 18 so that it is substantially flush with the exterior roof 10 and the body side structure 11 of the vehicle (see FIGS. 6-8).

In addition to the seal means 16 carried by the upper frame means 14, the door assembly A also includes a pair of seals 70 and 72 adjacent the belt line 36 of the lower door body 12. The seal 70 is suitably secured to the inner door panel 24 and extends laterally across the opening 36 at the belt line and engages the window along its inside. The seal 72 is suitably carried by the outer panel 22 of the lower door body 12 at its belt line 36 and is adapted to engage a sash plate 74 secured to the lower end of the window 18 when the latter is in its closed position and adapted to engage the outer side of the window 18 as it is being lowered into the well 34. The seals 70 and 72 each include a readily deflectable portion to enable the window to be readily moved into and out of the well 34, and in a manner to be hereinafter ore fully described.

The window 18, as best shown in FIG. 2, is movable between a closed position, as shown by the solid lines in FIGS. 1 and 2, in which it closes off the opening defined by the upper frame 14 above the belt line 36 and an open position, as shown by the phantom lines in FIGS. 1 and 2, in which it is wholly disposed within the well 34 of the lower door body 12. The window 18 is adapted to be moved between its open and closed positions by the window regulator mechanism 22. To this end, the window regulator mechanism comprises a conventional sector gear 80, a regulator arm 82 which has one end rigidly secured to the sector gear 80 and its other end pivotally connected to a roller 84 which is rollably received within a guide track 86 secured to the sash plate 74. The sash plate 74 is suitably secured to the lower edge or end of the window 18. The sector gear 80 at its upper end, as viewed in FIG. 1, and the regulator arm 82 rigidly secured thereto are pivotally connected via a pivot shaft 88, to a suitable bracket means (not shown) secured to the inner door panel 24. The sector gear 80 is adapted to be rotated in opposite directions by a pinion gear 90 in meshed engagement therewith, the pinion gear in turn being operatively connected either to manual operable handle (not shown) carried by the inner panel 24 of the lower door body 12 or operatively connected with a power operated mechanism (not shown). As readily apparent from FIG. 1, rotation of the sector gear 80 and sector arm 82 in a counterclockwise direction causes the window 18 to be raised and with the roller 84 rolling within the guide track 86 and that rotation of the sector gear 80 and window regulator arm 82 in a clockwise direction causes the window 18 to be lowered and with the roller 84 rolling within the guide track 86.

In accordance with the provisions of the present invention, a novel window guide arrangement 20 is provided for guiding the movement of the window 18 between its open and closed positions. In general, the window guide arrangement is operable to cause the window 18 adjacent its lower end to be moved inwardly from the outer panel 22 of the door body 12 as it is being lowered from its closed position and to cause the upper end of the window to pivot outwardly away from the frame means 14. After the initial inward movement, the window 18 is guided for movement along its radius R until it reaches it lower or fully open position. When the window 18 is moved from its fully open position towards its closed position, it will follow its radius of curvature R until it approaches its closed position. At this point, the window 18 has its lower end portion moved outwardly toward the outer panel 22 of the door body 12 and its upper end moved inwardly against and into tight engagement with the seal means 16 at the top edge of the window. This latter movement causes the window 18 to be substantially flush with the outer exterior side 22 of the lower door body 12 at its belt line 36 and positions the window 18 so that its side and top edges are substantially flush with the exterior body structure 10 and 11 of the vehicle.

The window guide arrangement 20 comprises a pair of one piece guide tracks 100 and 102 carried by the lower door body 12 adjacent its forward and rearward ends 26 and 28 and a pair of guide means 106 and 108 secured to the window 18 adjacent its front side edge and rear side edge and which are cooperably received by the guide tracks 100 and 102. The guide tracks 100 and 102 are of an identical construction and therefore only the guide track 102 will be described in detail and the same reference numerals will be employed to designate corresponding parts of the guide track 100.

Figure 7:
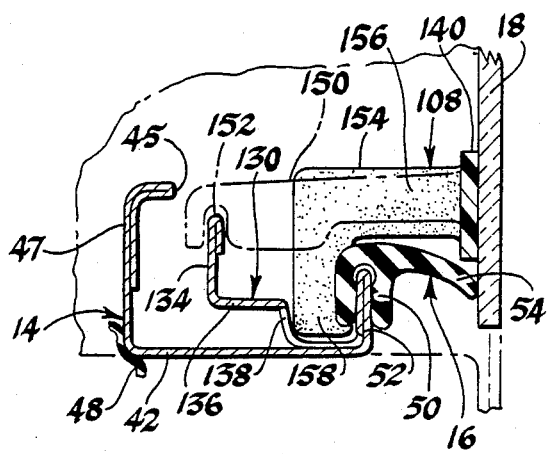
FIG. 7 is an enlarged fragmentary sectional view taken along the lines 7—7 of FIG. 2.
Figure 8:
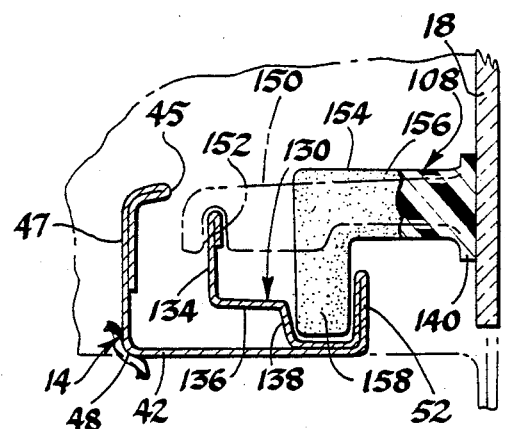
FIG. 8 is an enlarged fragmentary sectional view taken along the lines 8—8 of FIG. 2.
Figure 6:
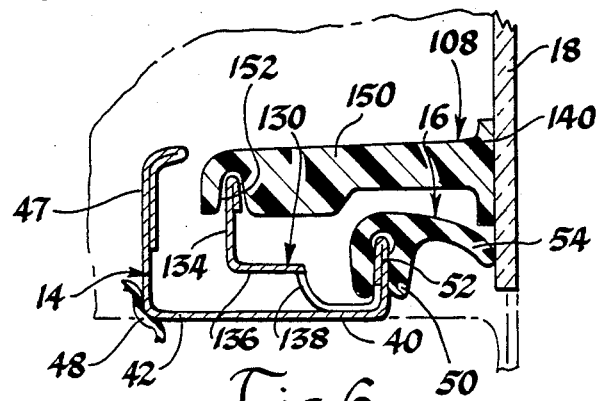
FIG. 6 is an enlarged fragmentary sectional view taken along 6—6 of FIG. 2.

The guide track 102 is of a one piece sheet metal, stamped construction and comprises a lower channel portion 110 which is U-shaped as viewed in cross section (in FIGS. 6–8). The guide track 102 is vertically curved, as viewed in elevation in FIG. 1, to have the same radius of curvature as the radius of curvature R of the window 18. The lower portion 110 of the U-shaped track extends from adjacent the bottom 30 to the opening or belt line 36 of the door assembly A.

The U-shaped lower portion 110 of the guide track 102 has an outer wall 114, an inner wall 116 and a bottom 118. The walls and bottom 114, 116 and 118 of the lower portion of the track 102 define a track opening 119 facing forwardly of the door body 12 and facing the track opening 119 in the track 100 adjacent the front end of the door body 12. The lower portion 110 of the track is suitably adjustably secured to the inner panel 24 via a suitable bracket means 122. The lower portion 110 of the track 102 has an upper end section 124 which is skewed and angled upwardly and outwardly toward the outer panel 22 of the lower door body 12. The skewed section 124 and the remaining part of the lower track portion 110 defines a continuous track opening 119. The skewed track section 124 defines with the remainder of the lower track portion 110 an obtuse included angle therebetween.

The track 102 also includes an upper portion 130 which is generally L-shaped throughout the greater portion of its length. The upper track portion 130 has an outer wall 134 which is a continuation of the inner wall 116 of the track portion 110 and a bottom or transversely extending wall 136. The upper track portion 130 is nestled within the side 42 of the upper frame 14 and is suitably secured to or welded therein. The upper track portion 130 extends along the lower track portion 110 within the door body 12 of each track 100, 102 for a major portion of its length and extends upwardly within the front side 40 of the frame 14 for its entire length and upwardly within the rear side 42 of the frame 14 for approximately one third to one half its length proceeding upwardly from the belt line 36 of the door assembly A, as best shown in FIG. 1. The upper portion 130 of the track 102 forms a smooth transition to the skewed section 124 of the lower track portion 110 as indicated by the reference numeral 138 in FIGS. 6 and 7. The upper track portion 130 in essence comprises a single flange or rail which is the simplest form of track.

The guide means 106 and 108 are of an identical construction and therefore only the guide means 108 will be described and the same reference numerals will be applied to corresponding parts of the guide means 106. The guide means 108 is secured to the right side of the window 18 and is slidably received on the upper guide track portion 130 and slidably received within the lower guide track portion 110. The guide means 108 comprises a one piece plastic member having a base portion 140 which abuts against the inside of the window 18 adjacent its right side edge, as viewed in FIG. 1, and is suitably secured to the window 18 via flush rivets 142 adjacent its upper and lower ends. The guide means 108 further comprises an upper guide pin 150 integral with the base 140 and which extends perpendicularly to or transversely of the window 18. The guide pin 150 extends inwardly of the window 18 and is slotted adjacent its free end as indicated by the reference numeral 152 to loosely, slidably receive the flange 134 of the upper guide track portion 130, as best shown in FIGS. 6–8. The slot 152 has a width which is greater than the width of the flange 134, and for a reason to be hereinafter more fully described. The guide means 108 also includes a lower pin 154 formed integral with the base portion 140 and which has a first portion 156 which extends perpendicularly or transversely of the inside of the window 18 and a free end portion 158 which extends perpendicularly to the first portion 156 and which is in the form of a rounded end or head which is slidably received within the lower guide track portion 110.

It should be noted that the distance between the centerlines of the guide pins 150 and 154 is approximately one third the overall height or vertical extent of the window 18. That is, a distance between the top edge of the window and the upper guide pin 150 is twice the distance between the upper guide pin 150 and the lower guide pin 154. Since there are four guide pins secured to the window 18, i.e., two vertically spaced pins at the front edge of the window 18 and two vertically spaced pins at the rear edge of the window, good stability is achieved for guiding the window 18 through its movement.

The operation of the guide arrangement 20 will now be described. When the window 18 is in its fully closed position, as shown by the solid lines in FIGS. 1 and 2, the upper guide pins 150 are slidably disposed on the upper track portions 130 adjacent their upper end and the lower guide pins 156 are disposed within the skewed sections 124 of the lower track portions 110 of the guide tracks 100 and 102. In this position, the lower end of the window 18 is in tight abutting engagement with the seal means 72 carried by the outer door panel 22 adjacent its belt line so that the window 18 is disposed substantially flush with the exterior surface of the outer door panel 22. Likewise, the upper end of the window 18 due to the upper guide pin connections with the upper guide portion 130 is held in tight sealing engagement with the seal means 16 at the upper end at the top 44 of the frame 14 and the window 18 is positioned such that its exterior side is substantially flush with the adjacent roof and side body structure 10, 11.

When it is desired to move the window 18 from its closed position towards its open position, the window regulator mechanism 22 will be operated to cause the window 18 to be lowered. As the window 18 is lowered, the guide pins 154 cause the lower end of the window 18 to be moved inwardly from the outer panel 22 of the lower door body 12 toward the inner panel 24 thereof. This also moves the lower sash plate 74 away from the seal means 72 to relieve the seal pressure adjacent the outer side of the window, although it does further deflect the seal means 70 carried by the inner panel 24. Also, this inward movement of the lower end of the window 18 causes the upper end of the window 18 to move outwardly away from the upper part of the seal means 16. The movement is caused due to the fact that the slotted pins 150 permit the window 18 to pivot on the upper guide track portions 130 and move the upper end of the window 18 outwardly.

As the window 18 is further lowered, the lower guide pins 154 will be received within the lower portions 110 of the guide tracks 100 and 102 and cause the window 18 to move along a path which is the same as its radius of curvature R until it reaches its bottommost position, as shown by the phantom lines in FIG. 1 and 2, in which position the window 18 is wholly disposed within the well 34.

When it is desired to close the window 18, the operator will cause the window regulator mechanism 22 to raise the window 18. As the window 18 is raised, it will follow its radius of curvature R and with the upper guide pins and lower guide pins merely sliding along their respective upper and lower track portions 130 and 110 until the lower guide pins 154 reach the skewed sections 124. When this occurs, the guide pins 154 will be caused to be moved upwardly and outwardly toward the outer door panel 22, which in turn causes the lower end of the window 18 to be moved outwardly toward the outer door panel 22. As this occurs, the upper guide pins 150 due to their slots 152 will cause the window 18 to pivot about the upper guide track portions 130 so that the upper end of the window 18 will be moved toward the seal means 16 carried by the frame 14. As the lower end of the window 18 moves outwardly toward the outer door panel 22, it will push against the seal means 72 and move away from the seal means 70 and the lower end of the window will relieve some of the frictional sealing engagement with seal means 16 along the lower sides of the latter and move the upper end of the window into tighter sealing engagement with the seal means 16. When the window 18 has been fully raised, as shown by the solid lines in FIGS. 1 and 2, the lower end of the window 18 will be pushed against the seal means 72 so that its exterior side is flush or substantially flush with the exterior outer panel 22 of the door body 12 and the upper end of the window will be in tight sealing engagement with the seal means 16 along the top and sides of the frame 14 and the sides and top of the window 18 will be substantially flush with the exterior roof and body structure 10, 11 of the vehicle.

It has been found that good window stability can be achieved by providing four guide pins connecting the window 18 to the guide tracks 100 and 102 and good sealing pressure can be achieved when the window 18 is in its closed position by positioning the guide pins so that their distance from each other is approximately half the distance between the upper guide pins 150 and the upper edge 18a of the window 18.

From the foregoing, it should be apparent that a novel simplified window guide arrangement 20 has been achieved for guiding movement of the window 18 between its open and closed positions and such that it can position the window 18 so as to be substantially flush at all sides with the exterior body structure of the vehicle. It should also be apparent that the guide arrangement 20 is of a very simple and economical construction having only a minimum number of parts and that these parts can be readily fabricated without requiring any close manufacturing limitations.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A door assembly for use with a vehicle having body structure defining a door opening comprising:
   a door means having a lower door body including spaced inner and outer panels and fore and aft ends which together define a well having an elongated top opening at its belt line and an upper frame carrying a deformable seal along its sides and top and with the upper frame in conjunction with the belt line of the lower body defining a window opening,
   a window located exteriorly of said upper frame and supported for movement between a closed position in which it engages the seal means on said upper frame and closes off said opening and an open position in which it is disposed within said well, and a window guide arrangement carried by said door means and which is operable to guide the movement of the window between its positions and to position the window so that it is substantially flush with the exterior of the lower body and so that it is adapted to be substantially flush with the body structure of the vehicle surrounding the upper frame, the improvement being that said guide arrangement includes
   a. a pair of guide tracks carried by the door means adjacent its fore and aft ends which face each other;
   said guide tracks each having a channel shaped lower portion disposed within said well and extending from adjacent its bottom to adjacent its top and having its uppermost end section skewed outwardly toward the outer door panel at its belt line and a flanged portion extending along the side of the upper frame and into said well;
   b. a pair of guide means secured to the window at its inner side and adjacent its side edges, each of said guides having a lower guide pin adjacent the lower end of the window which is slidably received within the adjacently located channel shaped lower track portion and an upper guide pin located between the upper and lower ends of the window which is slotted and slidably received on the flanged guide track portion, and said guide tracks and guide pins being operable to guide the movement of said window when it is being lowered and raised and said skewed sections of said lower track portions causing said lower guide pins and lower end of said window to be moved outwardly toward the outer door panel while the upper slotted guide pins allow said window to pivot thereabout so that the upper end of the window is caused to move inwardly into sealing engagement with the seal means as the window approaches its fully raised position whereby the window will be substantially flush with the adjacent exterior body structure and belt line of the vehicle, and said skewed section of said lower track portions causing the lower guide pins and lower end of the window to be moved inwardly from the outer door panel while the slotted upper guide pins allow the window to pivot so that its upper end moves outwardly from the seal means as it is being initially lowered from its fully closed position.

2. A door assembly for use with a vehicle having body structure defining a door opening comprising:

a door means having a lower door body including spaced inner and outer panels and fore and aft ends which together define a well having an elongated top opening at its belt line and an upper frame carrying a deformable seal adjacent and along its sides and top and with the upper frame in conjunction with the belt line of the lower body defining a window opening, a window located exteriorly of said upper frame and supported for movement between a closed position in which it engages the seal means on said upper frame and closes off said opening and an open position in which it is disposed within said well, and a window guide arrangement carried by said door means and which is operable to guide the movement of the window between its positions and to position the window so that it is substantially flush with the exterior of the lower body and so that it is adapted to be substantially flush with the body structure of the vehicle surrounding the upper frame, the improvement being that said guide arrangement includes a. a pair of single piece guide tracks carried by the door means adjacent its fore and aft ends which face each other;

said guide tracks each having a channel shaped lower portion disposed within said well and extending from adjacent its bottom to adjacent its top and having its uppermost end section skewed and angled outwardly toward the outer door panel at its belt line and a flanged portion extending along the side of the upper frame and into said well below the skewed section of the lower track portion;

b. a pair of guide means secured to the window at its inner side at a location adjacent its side edges and which extend inwardly from the inner side of said window, each of said guides including a lower transversely extending guide pin adjacent the lower end of the window which is slidably received within the adjacently located channel shaped lower track portion and an upper transversely extending guide pin located between the upper and lower ends of the window which is slotted and slidably received on the flanged guide track portion, and said guide tracks and guide pins being operable to guide the movement of said window when it is being lowered and raised and said skewed sections of said lower track portions causing said lower guide pins and lower end of said window to be moved outwardly toward the outer door panel while the upper slotted guide pins allow said window to pivot thereabout so that the upper end of the window above the pivot moves inwardly into sealing engagement with the seal means as the window approaches its fully raised position whereby the window will be substantially flush with the adjacent exterior body structure and belt line of the vehicle, and said skewed section of said lower track portions causing the lower guide pins and lower end of the window to be moved inwardly from the outer door panel while the slotted upper guide pins allow the window to pivot so that its upper end moves outwardly from the seal means as it is initially lowered from its fully closed position..

3. A door assembly for use with a vehicle having body structure defining a door opening comprising:

a door means having a lower door body including spaced inner and outer panels and fore and aft ends which together define a well having an elongated top opening at its belt line and an upper frame carrying a deformable seal adjacent and along its sides and top and with the upper frame in conjunction with the belt line of the lower body defining a window opening, a window located exteriorly of said upper frame and supported for movement between a closed position in which it engages the seal means on said upper frame and closes off said opening and an open position in which it is disposed within said well, and a window guide arrangement carried by said door means and which is operable to guide the movement of the window between its positions and to position the window so that it is substantially flush with the exterior of the lower body and so that it is adapted to be substantially flush with the body structure of the vehicle surrounding the upper frame, the improvement being that said guide arrangement includes a. a pair of one-piece guide tracks carried by the door means adjacent its fore and aft ends which face each other;

said guide tracks each having a channel shaped lower portion disposed within said well and extending from adjacent its bottom to adjacent its top and having its uppermost end section skewed and angled outwardly toward the outer door panel at its belt line and a flanged portion extending along the side of the upper frame and into said well below the skewed section of the lower track portion;

b. a pair of one-piece guide means secured to the window at its inner side at a location adjacent its side edges, each of said guides having a base portion, a lower integral guide pin adjacent the lower end of the window having a first portion which extends inwardly of the inner side of the window and a free end portion which extends transversely of said first portion and is slidably received within the adjacently located channel shaped lower track portion, and an integral upper guide pin located between the upper and lower ends of the window and which extends inwardly of the inner side of said window and has a free end which is slotted and slidably received on the flanged guide track portion, the distance between the upper guide pin and the top of the window being substantially twice the distance between the upper and lower guide pins, and said guide tracks and guide pins being operable to guide the movement of said window when it is being lowered and raised and said skewed sections of said lower track portions causing said lower guide pins and lower end of said window to be moved outwardly toward the outer door panel while the upper slotted guide pins allow said window to pivot thereabout so that the upper end of the window above the pivot moves inwardly into sealing engagement with the seal means as the window approaches its fully raised position whereby the window will be substantially flush with the adjacent exterior body structure and belt line of the vehicle, and said skewed section of said lower track portions causing the lower guide pins and lower end of the window to be moved inwardly from the outer door panel while the slotted upper guide pins allow the window to pivot so that its upper end moves outwardly from the seal means as it is initially lowered from its fully closed position.

4. A door assembly, as defined in claim 3, and wherein said one-piece guide tracks are stamped from sheet metal.

5. A door assembly, as defined in claim 3, and wherein said seal means is located closer to the side edge of the window than said guide means.

6. A door assembly, as defined in claim 5, and wherein the base of said guide means is connected to the window via flush rivets extending perpendicularly through the window and base.

* * * * *